Patented July 3, 1923.

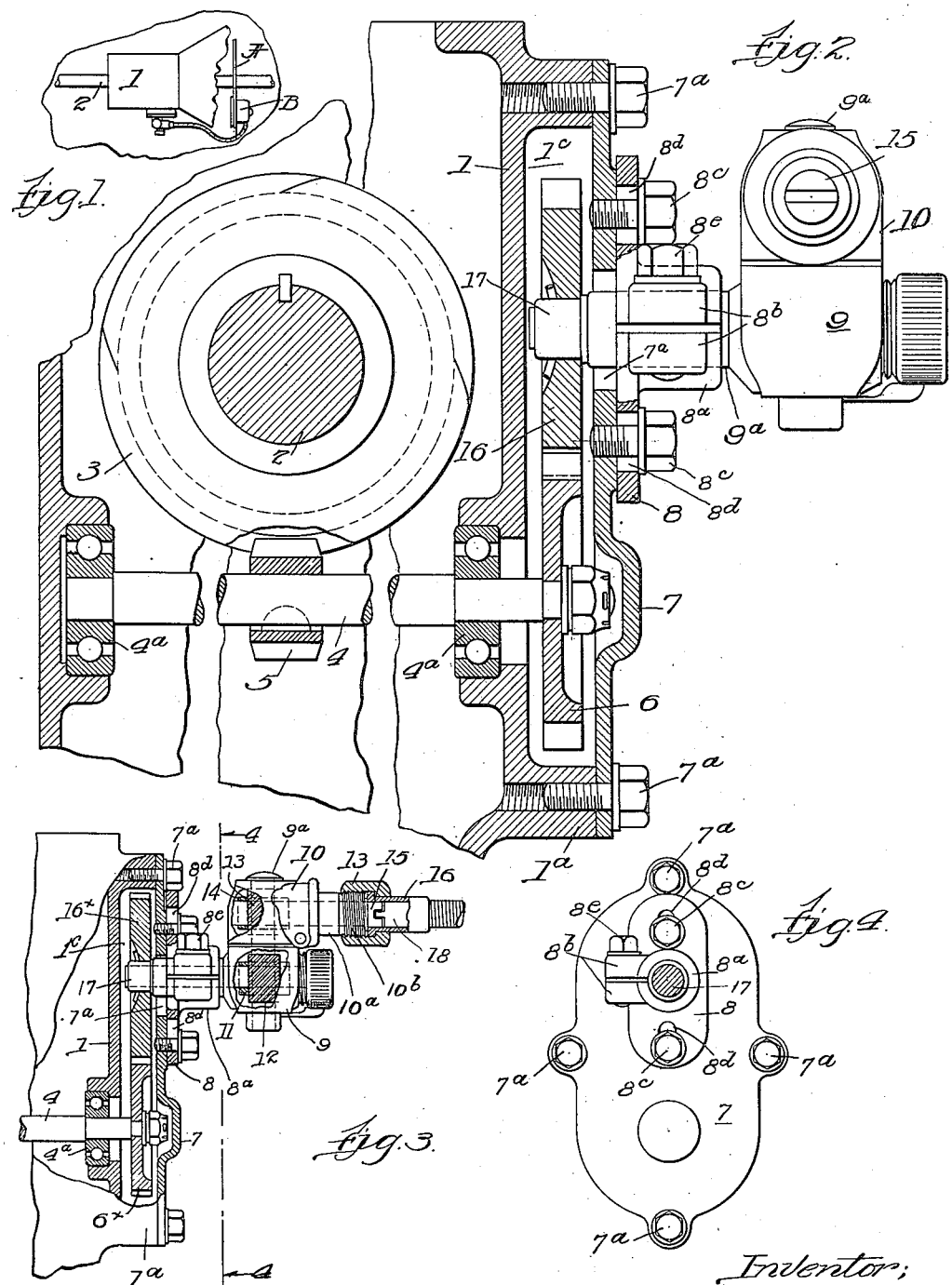

1,460,522

UNITED STATES PATENT OFFICE.

FREDERIK G. WHITTINGTON, OF EVANSTON, ILLINOIS, ASSIGNOR TO STEWART-WARNER SPEEDOMETER CORPORATION, OF CHICAGO, ILLINOIS, A CORPORATION OF VIRGINIA.

TRANSMISSION DRIVE FOR SPEEDOMETERS.

Application filed April 3, 1922. Serial No. 549,192.

*To all whom it may concern:*

Be it known that I, FREDERIK G. WHITTINGTON, a citizen of the United States. residing in Evanston, in the county of Cook and State of Illinois, have invented certain new and useful Improvements in Transmission Drives for Speedometers, of which the following is a specification, reference being had to the accompanying drawings, forming a part thereof.

The purpose of this invention is to provide an improved construction in driving connections from the transmission of an automotive vehicle to a speedometer or like instrument carried by the vehicle. It consists in the elements and features of construction shown and described as indicated in the claims.

In the drawings:—

Figure 1 is a small diagrammatic view showing the transmission casing and dashboard of a vehicle and the drive connections for indicating the relative position of the parts.

Figure 2 is vertical section of the transmission casing and parts embodying the invention mounted thereon, axial with respect to the shaft of the gear train shown.

Figure 3 is a detail elevation of an applied supplemental housing member which carries the flexible shaft driving connection.

Figure 4 is a section at the line 4—4, on Figure 3.

In the structure shown in the drawings the transmission casing is indicated at 1, the dash-board of the vehicle on which the speedometer may be mounted at A, and the drive connections from the transmission casing to the instrument indicated on the transmission casing at B. 2 is the propeller shaft extending fore-and-aft, 3 is a gear thereon, 4 is a counter-shaft journaled in the transmission casing and protruding therefrom at one side thereof, having within the casing a gear pinion, 5, meshing with the gear, 3, said gear pinions being of the spiral type for transmitting motion between shafts lateral and transverse with respect to each other and, as shown, in planes at right angles to each other. On the end of the shaft, 4, which protrudes through the side of the casing there is demountably mounted a gear, 6. The casing has an annular boss at 1ª, forming an outwardly-open cavity which encloses the gear, 6, and the supplemental housing member is in the form of a cap plate, 7, providing a supplemental housing chamber for the gear, 6, and an intermeshing gear, 16, which is demountably mounted on the initial or driving shaft of the flexible gear joint which in general is of familiar type as comprising gear housing members, 9 and 10, swiveled together about a pivot bolt, 9ª, on which there are journaled integral gears, 12 and 13, the gear, 12, meshing with the gear, 11, on said initial or driving shaft, 17, which is journaled in the housing member, 9, the other of the integral gear, 13, being meshed with the driving gear, 14, on the final or driven shaft, 18, journaled in the housing member, 10, said last mentioned gear housing member being adapted to terminate for coupling the casing of a flexible shaft and the protruding end of the shaft, 15, being adapted for coupling the rotating element of a flexible shaft. This gear joint, comprising the two housing members, 9 and 10, is mounted on the outer side of the supplemental housing member, 7, by means of a mounting plate, 8, which constitutes a closure for the aperture, 7ª, in the supplemental housing member, 7, through which the shaft, 17, and its journal bearing protrudes into the supplemental housing chamber indicated at 1ᶜ. This mounting plate, 8, for its function of mounting the gear housing joints, 9 and 10, has an outwardly protruding hollow boss, 8ª, rifted at one side and having lugs, 8ᵇ, projecting from that side at opposite sides of the rift for receiving a clamping bolt, 8ᶜ, by which the hollow boss is clamped upon the intruded end of the housing member, 9, which constitutes the journal bearing of the shaft, 17. The gears, 6 and 16, are demountably mounted and hinged upon their respective shafts, 4 and 17, for convenience in substituting for them other gears of different diameters for varying the speed transmitted from the shaft, 4, to the ultimate shaft of the train and which it transmits to the flexible shaft extending to the speedometer or other instrument to be operated. For the purpose of adapting the device for permitting the substitution of gears the sum of whose diameters is different from the sum of the diameters of the gears, 6 and 16, the mounting plate, 8, is adapted to be adjustably mounted on the supplemental housing member, 7, this adjustability being obtained by providing for the securement of the plate, 8, to the member, 7, by bolts, 8ᶜ, projecting through the slots, 8ᵈ, of the plate, 8, which are elongated in the plane of the axis of the shafts, 4 and 17, and transversely to said shafts.

It will be understood that for changing the gears in the supplemental housing chamber, 1ᵇ, the supplemental housing member, 7, which is secured by bolts, 7ᵇ, taking into the boss, 1ᵃ, will be removed, thereby giving access on the removed housing member to the gear, 16, and on the transmission casing to the gear, 6, for which other gears may by substituted to effect the desired speed change; or, for that purpose a gear of different diameter may be substituted for the gear, 16, without change of the gear, 6, or for the gear, 6, without change of the gear, 16, proper accommodation to the change in total diameters being made by adjusting the plate 8, at the securing bolts on the supplemental housing member, 7, as above described.

I claim:—

1. In an automobile vehicle in combination with a transmission casing, a transverse power driven shaft journaled therein and protruding therefrom; a gear demountably carried on the protruding end of said shaft; a supplemental housing member applied on the side of the casing through which said shaft protrudes enclosing said gear; a gear housing and intermeshing gears and their respective shafts therein demountably mounted on the supplemental housing with one of the shafts protruding thereinto, and a gear demountably carried by said last mentioned shaft meshing with the first mentioned gear in the supplemental housing.

2. In the construction defined in claim 1, foregoing, the supplemental housing being constituted by an annular boss on the transmission casing on which the supplemental housing member is applied.

3. In the construction defined in claim 1, foregoing, the means for mounting the gear housing on the supplemental housing member being a plate securable to the supplemetal housing member at the position at which it is movable to carry the initial shaft in the gear housing toward and from the shaft which protrudes from the transmission casing.

4. In the construction defined in claim 1, foregoing, the means for mounting the gear housing on the supplemental housing being a plate having means for clamping said gear housing, the means for securing said plate to the supplemental housing member being adapted for adjusting the plate in a line toward and from the shaft which protrudes from the transmission casing; whereby the device may be accommodated to gears of similar diameters in the supplemental housing.

5. In an automotive vehicle, in combination with a transmission casing, a transverse power shaft journaled therein and protruding therefrom; a gear on the protruding end of said shaft; a supplemental housing member applied on the side of said casing through which the shaft protrudes; a gear train terminating with a suitable connection for a flexible shaft, and a housing therefor terminating with suitable connections for a flexible shaft casing; said gear train housing being adapted for adjustable mounting on the supplemental housing member with the initial shaft of the train intruded therethrough into the supplemental housing chamber, and a pair of intermeshing gears demountably mounted respectively on said protruding and intruding shaft; whereby said last mentioned gears may be readily substituted by others for changing the speed transmitted to the flexible shaft.

In testimony whereof, I have hereunto set my hand at Chicago, Illinois, this 28th day of March, 1922.

FREDERIK G. WHITTINGTON.